No. 626,135. Patented May 30, 1899.
C. O. BASTIAN.
ELECTROLYTIC METER.
(Application filed Sept. 26, 1898.)

(No Model.) 3 Sheets—Sheet 1.

Witnesses:
John Chalmers Wilson
Percy C. Bowen

Inventor:
C. O. Bastian
by Wilkinson & Fisher
Attorneys.

THE NORRIS PETERS CO., PHOTO-LITHO., WASHINGTON, D. C.

No. 626,135. Patented May 30, 1899.
C. O. BASTIAN.
ELECTROLYTIC METER.
(Application filed Sept. 26, 1898.)

(No Model.) 3 Sheets—Sheet 2.

Witnesses:
John Chalmers Wilson
Percy C. Bowen

Inventor:
C. O. Bastian
By Wilkinson & Fisher
Attorneys.

No. 626,135. Patented May 30, 1899.
C. O. BASTIAN.
ELECTROLYTIC METER.
(Application filed Sept. 26, 1898.)
(No Model.) 3 Sheets—Sheet 3.
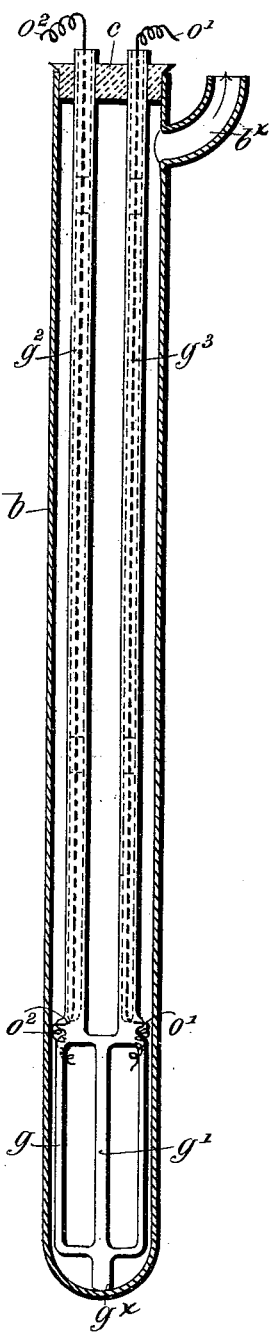
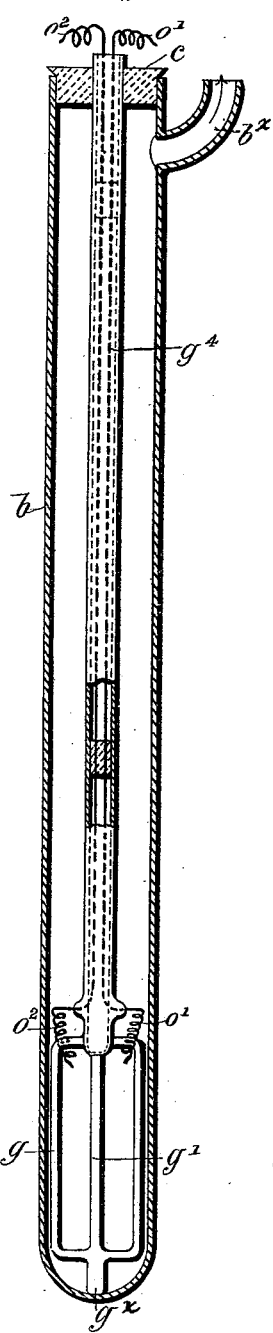
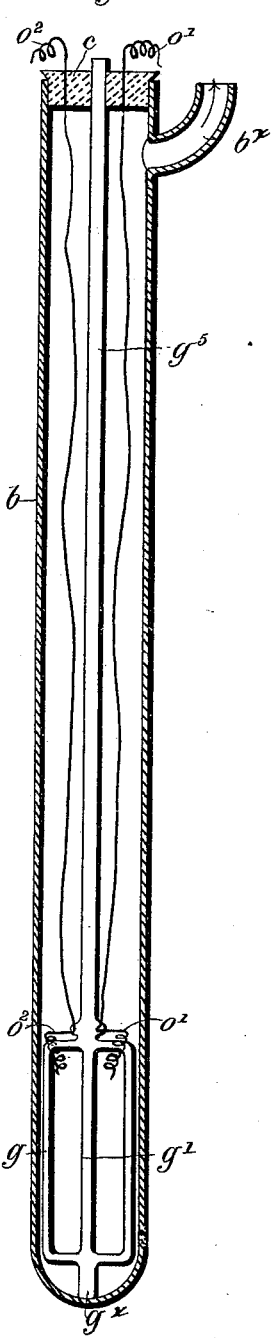
Witnesses: Inventor:
C. O. Bastian
by Wilkinson & Fisher,
Attorneys
THE NORRIS PETERS CO., PHOTO-LITHO., WASHINGTON, D. C.

UNITED STATES PATENT OFFICE.

CHARLES O. BASTIAN, OF LONDON, ENGLAND.

ELECTROLYTIC METER.

SPECIFICATION forming part of Letters Patent No. 626,135, dated May 30, 1899.

Application filed September 26, 1898. Serial No. 691,883. (No model.)

*To all whom it may concern:*

Be it known that I, CHARLES ORME BASTIAN, electrical engineer, a subject of the Queen of Great Britain, residing at $8^a$ Manchester Square, London, England, have invented certain new and useful Improvements in or Relating to Electrolytic Electrical Meters, (for which I have made application for Letters Patent in Great Britain, dated March 1, 1898, No. 5,034,) of which the following is a specification.

This invention relates to electrolytic electrical meters, and has for its object to improve such meters in various respects and facilitate and simplify, and consequently cheapen, the production thereof, my present improvements consisting of an improved construction of the electrodes for use in electrolytic meters, an improved frame on which the platinum of the electrodes is mounted, an improved method and means of mounting thin platinum sheets on a fixed frame to form electrodes for meters, method and means of supporting or arranging said electrodes in the vessel holding the electrolyte, improved method and means of connecting up the platinum wires or conductors leading to the electrodes, method and means of preventing evaporation of the electrolyte or escape thereof from the containing vessel, scale for use on or in conjunction with the said vessel for containing the electrolyte, said scale being adapted, if desired, to be adjusted with respect to said vessel, method and means to calibrate such electrical meters, and having other features of novelty or details of improvement, all of which will be hereinafter more fully described, and finally pointed out in the claims.

Figure 1:
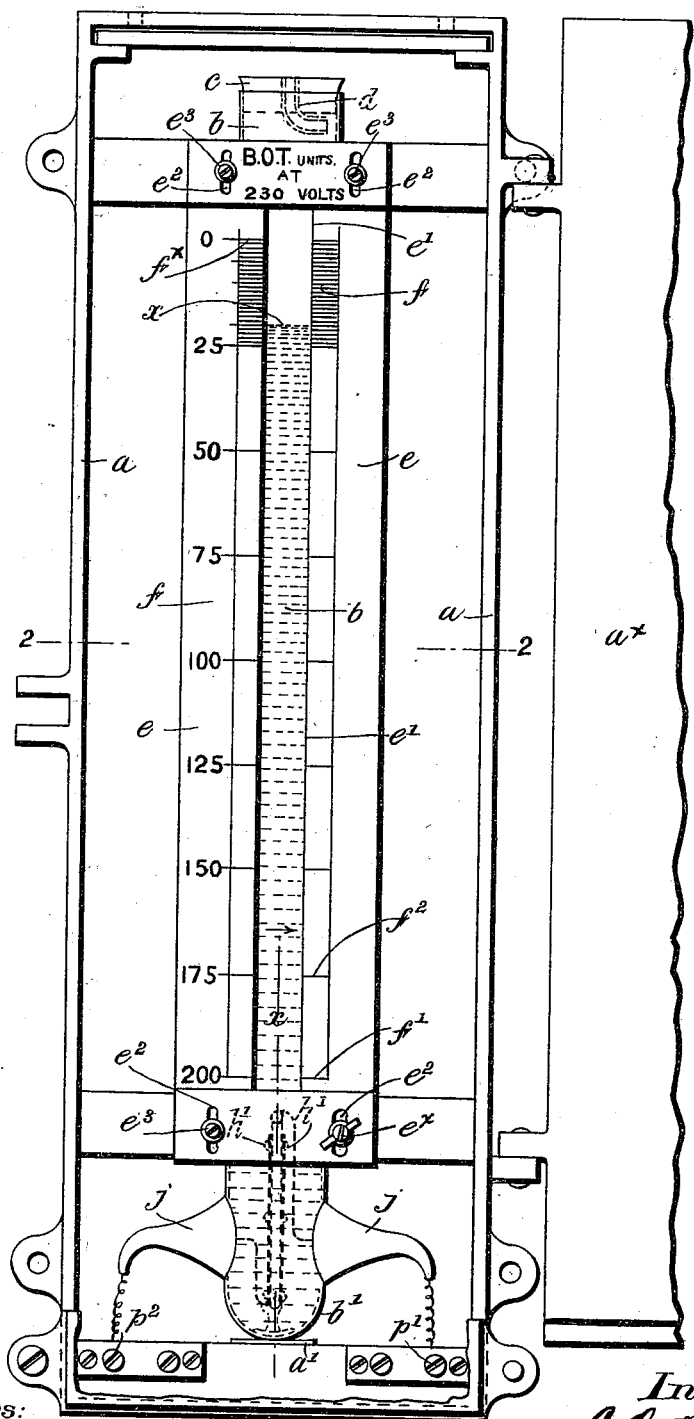
Figure 3:
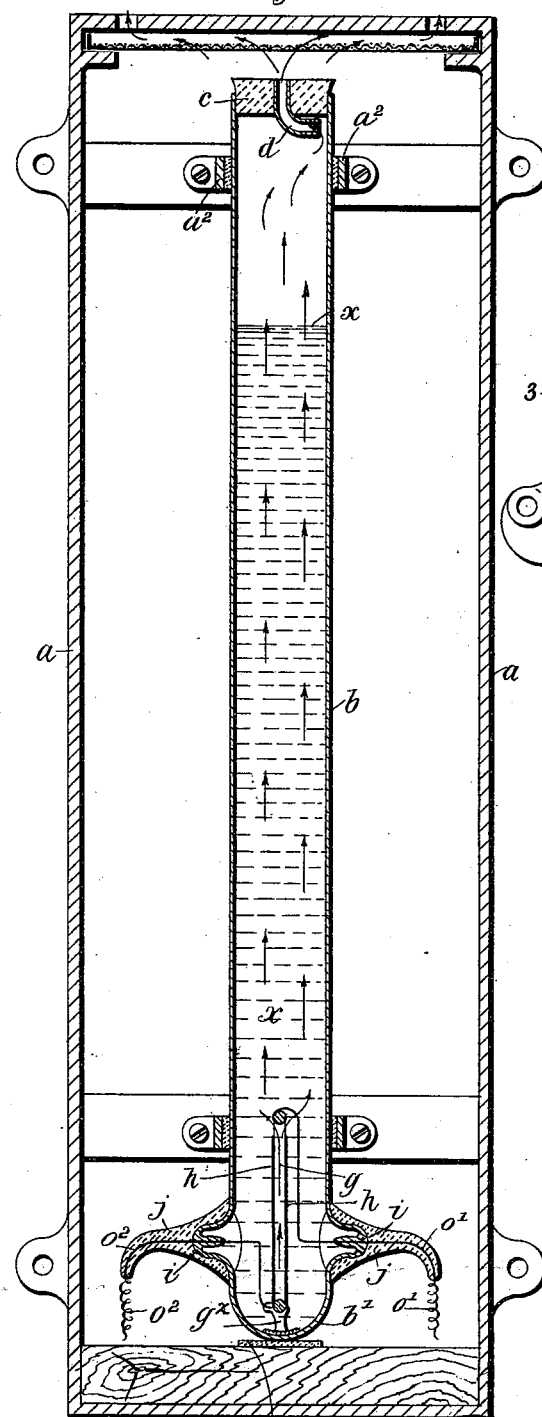
Figure 2:
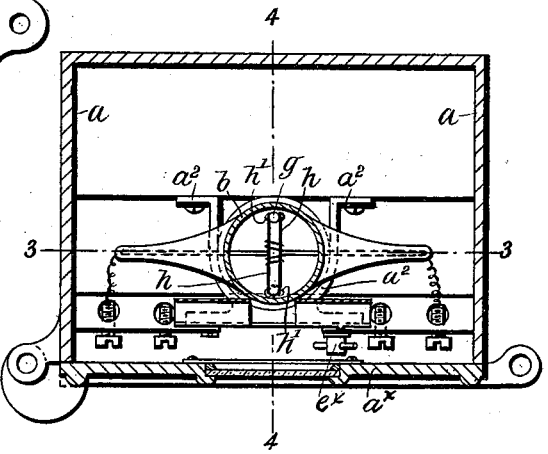
Figure 4:
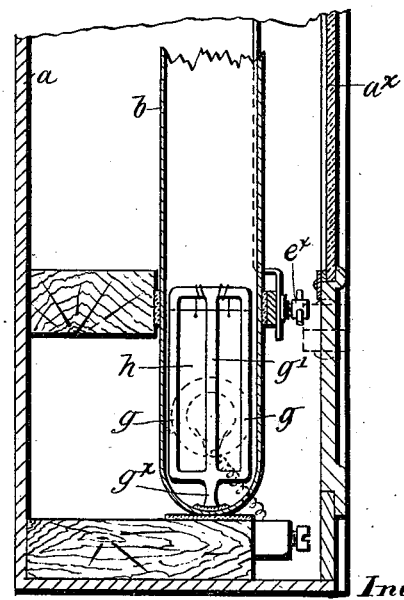

Referring to the accompanying drawings, Figure 1 is a front view of an electrolytic electrical meter according to the present invention with the hinged front or door "open" to show the arrangement and construction of the parts inside the case. Fig. 2 is a horizontal sectional view on line 2 2, Fig. 1. Fig. 3 is a vertical sectional view on line 3 3, Fig. 2. Fig. 4 is a vertical sectional part view on line 4 4, Fig. 2. Figs. 5, 6, and 7 are views in elevation of the vessel for holding the electrolyte with the electrodes arranged and mounted therein and the wires or conductors connected or led to said electrodes in various modified ways, but in all three cases led in from the top of said vessel instead of entering through the side walls of said vessel, all as hereinafter explained.

Similar letters of reference indicate corresponding parts throughout.

$a$ is the casing or inclosing wall, and $a^\times$ the hinged front or door, adapted to be firmly locked or secured, so as to prevent access to the interior of said casing or to the meter mechanism within said cases, except by duly-authorized persons provided with the proper means for gaining access thereto.

$b$ is a tube or vessel adapted to receive and hold therein the electrolyte, such vessel being advantageously of clear glass or glass partly clear and partly otherwise—*i. e.*, clear in that part through which the height of the column of electrolyte is seen. This vessel $b$ is mounted or supported in any suitable manner in the casing $a$—for instance, by the bottom end $b'$ resting on the platform $a'$ in said casing, while a strap or collar $a^2$ encircles and holds the upper part of said tube $b$. The top of said tube is closed with a plug or stopper, such as $c$, and such stopper is provided with a bent tube $d$, passing therethrough, as shown in Figs. 1 and 3, to permit the gases produced by electrolysis to freely escape from said tube $b$, while preventing undue loss of the liquid, and also, if desired, I may employ oil, (advantageously paraffin,) which will float on the top of the electrolyte, and which will thus prevent evaporation of the electrolyte, while at same time it will permit the gases produced by electrolysis to readily pass up out of the electrolyte, and thus escape through the bent tube $d$ (or $b^\times$) to the atmosphere.

In the arrangement shown in Figs. 5, 6, and 7 there is no bent tube through the plug, but instead thereof a bent tube $b^\times$ is formed or arranged through the side of the tube and near the top thereof, as shown, this tube $b^\times$ serving the double purpose of outlet for the gases and filling-orifice.

$e$ is the index-scale or indicator, having a prolonged slot $e'$ therein, through which slot $e'$ the tube $b$ and column of electrolyte $x$ therein can be observed, and this slot $e'$ is advantageously of such a width and the top and bottom ends of the plate $e$ are so bent or formed that the vertical side wall of the tube $b$ will protrude through such slot $e'$. One or both sides or columns of said slotted plate bear the index markings or graduations $f$ thereon, these latter being of any suitable character or style. This slotted or other suitable index-scale or indicator $e$ (only one-half or one side of which may be used, if desired) is made of any suitable material—such, for instance, as aluminium—and may be so arranged and mounted as to be adjustable vertically with respect to the glass tube $b$, such vertical adjustment being permitted within certain limits by forming short vertical slots $e^2$ in the top and bottom portions of the plate $e$, through which slots $e^2$ pass fixed studs, pins, or screws $e^3$, which latter permit the plate $e$ to be freely moved up and down within the limits of the said slots $e^2$, while a thumb-screw or pinching-screw $e^\times$ passes through the fourth slot $e^2$, and by tightening up said pinching-screw $e^\times$ when the scale $e$ is in the desired position thereby the latter is fixed and maintained in such position, the object of such adjustment being to render it possible for the properly-authorized person when setting the meter—i. e., refilling the vessel $b$ with electrolyte—to raise or lower said index, so as to register the line $f^\times$—that is, zero—with the top of the column of liquid (electrolyte) $x$ in said vessel, and thus save the trouble and difficulty which would otherwise be caused (when refilling) in bringing said column of liquid $x$ to exactly register with the zero-mark on a fixed scale.

In order to calibrate or correctly place the markings on the index-scale or indicator according to my present invention, I proceed as follows: I first place so much of the liquid to be decomposed in the said glass tube or vessel $b$ as to fill same up to the bottom and limit mark $f'$ on the adjustable index-scale $e$ aforesaid, and then I proceed to further mark the latter as follows: I measure off a given quantity of the liquid to be decomposed, the amount of which, according to well-known laws or formulæ, will be decomposed by the passage therethrough of a known and predetermined quantity of electricity and then add same to the electrolyte already in the aforesaid glass tube or vessel $b$, and I then make the next mark $f^2$ on the index-scale to correspond with the height of the column of liquid $x$ after such addition, and then I add successive measured quantities of liquid and mark the height of the column of electrolyte after each such addition until the top of the scale $f^\times$—i. e., zero—is reached, and the space between each two such markings is respectively and accurately subdivided as desired, so that in the event of any slight variation or irregularity in the bore or capacity of the vessel at any particular point or points thereof this would not produce any (appreciable) error in the meter. The index-scale would be numbered or marked with any suitable signs or symbols to indicate the quantity of electricity which would pass through the meter before the column of electrolyte will be lowered to any such point or mark, respectively. Thus the meter can be calibrated in a very simple and reliable manner, and, moreover, same is effected without the necessity of passing any current through the meter when so calibrating.

The improved construction of the electrodes for use in electrolytic meters is as follows: Referring to Figs. 1 to 4, I form an open frame, advantageously a rectangular frame, as shown, of any suitable insulating material, glass being a very advantageous material for this purpose, this frame $g$ being advantageously provided with a central vertical bar $g'$ (see Fig. 4) to prevent buckling or touching of two thin sheets of platinum $h$, which are laid flat (and advantageously in parallel planes) upon the opposite sides of said frame $g\ g'$. (See Figs. 2 and 3.) These platinum sheets $h$ are mounted or secured to the frame $g$ when the latter is of glass by means of glass beads $h'$, (or when the frame is of other material than glass then these beads are of corresponding or other suitable material,) such glass beads being put on in a molten state, so as to adhere to the glass frame where it touches same and overlap and hold the edge of the platinum sheet, to which latter it also adheres. These platinum sheets $h$ are less in height than the frame $g$, (see Figs. 3 and 4,) so as to permit the gases (formed by electrolysis between said sheets $h$) to readily escape from between said platinum sheets. The circuit wires or conductors are led to these platinum electrodes in any suitable manner. In the case illustrated in Figs. 1 to 4 a platinum wire is welded or otherwise suitably connected to said electrodes, and each such platinum wire $o'\ o^2$ is coated with molten glass (of a suitable character, such as is known as "platinum glass") at or about the point where same will pass through the openings or nipples $i$, provided in the glass tube, and these wires $o'\ o^2$ thus prepared having been placed in position respectively in said nipples $i$ a glass seal is now made, so as to hermetically seal up the opening through each said nipple $i$, and thereby form a liquid-tight glass seal. Means may be provided to support the wires $o'\ o^2$ exterior of the tube $b$. For instance, a material capable of being molded on said wires, such as gutta-percha, may be employed to form an outer nipple or coating $j$, whence the wires $o'\ o^2$ are led to the terminals $p'\ p^2$ of the meter. The glass frame $g$ rests, by means of a leg $g^\times$, on the inside of the bottom of the tube $b$, while said frame and electrodes thereon are prevented from lateral movement or held sufficiently steady by means of the platinum wires $o'\ o^2$.

Referring now to Figs. 5, 6, and 7, the conductor-wires are not led through the side wall of the vessel $b$, but instead thereof are led to the electrodes from the other end of said tube, in Fig. 5 the glass frame $g\ g'$ being formed with two tubes $g^2$ and $g^3$, connected thereto, down which tubes $g^2\ g^3$ the conductor-wires $o'\ o^2$ are respectively led and pass out of said tubes $g^2$ $g^3$ at the lower end thereof, and these said conductor-wires $o'$ $o^2$ are connected to the electrodes as before described or in any suitable manner. In the arrangement shown in Fig. 6 both wires $o'$ $o^2$ are led down a single tube $g^4$, any suitable means being provided to prevent the wires coming into electrical contact within said tube, and at the lowermost part of said tube $g^4$ the wires $o'$ $o^2$ pass out therefrom (advantageously through glass seals) and thence are connected to the electrodes of the frame $g$ $g'$, as before, or in any other suitable manner. In Fig. 7 the frame $g$ $g'$ is carried on a single solid rod $g^5$, by which such frame $g$ $g'$ can be removed, and in this arrangement the conductor-wires $o'$ $o^2$ would be immersed in the electrolyte in said tube $b$, and in this case same would be of a material, such as platinum, not acted on by the acid in the electrolyte. $g^\times$ is a supporting-leg, which may be used at the bottom end of each frame.

It will be obvious that instead of using one glass tube as aforesaid my foregoing invention may be carried into practice with an electrolytic meter having two or more glass tubes or other vessels in liquid communication with one another.

The electrolyte is advantageously acidulated water.

By passing the whole of the current to be measured, or a known part thereof, through a meter constructed and operating according to the above-described invention thereby a very correct and direct reading can be obtained at all times of the exact amount of current which has passed since the last setting of the meter.

What I claim is—

1. The combination in an electrolytic electrical meter, of a glass frame or open-work support with thin sheets or surfaces of platinum mounted opposite one another on said frame so that said sheets cannot come in contact; means for securing said sheets to said frame; and platinum wires connected to said platinum sheets and also connected to the circuit-wires, substantially as described.

2. The combination in an electrolytic electrical meter of a glass frame or open-work support with thin sheets or surfaces of platinum mounted opposite one another on said frame and secured thereto so that said sheets cannot come in contact with each other; two conductor-wires held out of electrical contact with one another, and connected respectively to the circuit-wires and the platinum sheets; supports for said wires, and hermetic seals retaining said wires in said supports within the meter, substantially as described.

3. The combination in an electrolytic electrical meter of a glass frame or open-work support with thin sheets or surfaces of platinum mounted opposite one another on said frame so that said sheets cannot come in contact and glass beads or spots to attach said sheets to said frame substantially as and for the purposes hereinbefore set forth.

4. The combination in an electrolytic electrical meter of a glass frame or open-work support with thin sheets or surfaces of platinum mounted opposite one another on said frame so that said sheets cannot come in contact and glass beads or spots to attach said sheets to said frame and a glass leg on the bottom of said glass frame substantially as and for the purposes hereinbefore set forth.

5. In an electrolytic electrical meter, the combination with the vessel for holding the electrolyte, of an open-work frame of insulating material within said vessel, thin sheets of platinum mounted upon opposite sides of said frame and held against contact, and means for securing said sheets to said frame, substantially as described.

6. In an electrolytic electrical meter, the combination with the vessel for holding the electrolyte, of an open-work frame of insulating material within said vessel, thin sheets of platinum mounted upon opposite sides of said frame and held against contact, means for securing said sheets to said frame, a removable closure for said vessel and a bent tube entering said vessel and opening close beneath said closure, substantially as described.

C. O. BASTIAN.

Witnesses:
FRED. G. LUNNON,
H. D. JAMESON.